(12) United States Patent
Blum

(10) Patent No.: US 10,801,907 B2
(45) Date of Patent: Oct. 13, 2020

(54) PRESSURE MEASURING DEVICE

(71) Applicant: Holger Blum, Teufen (CH)

(72) Inventor: Holger Blum, Teufen (CH)

(73) Assignee: Biond Solution AG, Zurich (CH)

( * ) Notice: Subject to any disclaimer, the term of this patent is extended or adjusted under 35 U.S.C. 154(b) by 96 days.

(21) Appl. No.: 15/764,847

(22) PCT Filed: Sep. 29, 2016

(86) PCT No.: PCT/EP2016/073259
§ 371 (c)(1),
(2) Date: Mar. 29, 2018

(87) PCT Pub. No.: WO2017/055451
PCT Pub. Date: Apr. 6, 2017

(65) Prior Publication Data
US 2018/0238758 A1    Aug. 23, 2018

(30) Foreign Application Priority Data

Sep. 29, 2015   (DE) .................... 20 2015 105 132 U

(51) Int. Cl.
*G01L 11/02*    (2006.01)
*G01L 19/14*    (2006.01)
(Continued)

(52) U.S. Cl.
CPC ............ *G01L 11/02* (2013.01); *G01L 19/003* (2013.01); *G01L 19/143* (2013.01); *G01L 19/147* (2013.01)

(58) Field of Classification Search
CPC ..... G01L 7/00; G01L 7/08; G01L 7/16; G01L 11/02; G01L 19/00; G01L 19/003;
(Continued)

(56) References Cited

U.S. PATENT DOCUMENTS 4,189,724 A * 2/1980 Onuma ................ B01D 35/143
340/607
5,725,359 A    3/1998 Dongo et al.
(Continued)

FOREIGN PATENT DOCUMENTS

DE        102010021646 A1    12/2011
GB            1412502 A  *  11/1975  ........... G01L 9/0089
(Continued)

OTHER PUBLICATIONS

International Search Report and Written Opinion for PCT/EP2016/073259 dated Jan. 18, 2017.

*Primary Examiner* — Nguyen Q. Ha
(74) *Attorney, Agent, or Firm* — Womble Bond Dickinson (US) LLP; Joseph Bach, Esq.

(57) ABSTRACT

The invention refers to a pressure-measuring device for converting a mechanical or hydraulic pressurization in a measuring signal and for forwarding the measuring signal to a remote evaluation unit. The invention distinguishes by a fastening device (1) for fastening the pressure-measuring device to a machine housing of a motor or a pump, a transmitter head (4) which is arranged on a measuring device head (3) of the pressure measuring device and which is to be connected to a light source via a first optical fiber (25), a receiver head (5) which is arranged on the measuring device head (3) of the pressure measuring device and which is arranged opposite to the transmitter head (4) to receive the light emitted by the transmitter head (4) via a light path in the measuring device head (3) and to be connected to the evaluation unit via a second optical fiber (26), and a measuring element (14), which in case of a mechanical or hydraulic pressure is displaceable on the measuring device head (3) into the light path between the transmitter head (4) and the receiver head (5).

9 Claims, 2 Drawing Sheets

(51) Int. Cl.
   *G01L 23/02* (2006.01)
   *G01L 23/06* (2006.01)
   *G01L 19/00* (2006.01)

(58) Field of Classification Search
   CPC ..... G01L 19/14; G01L 19/143; G01L 19/147; G01L 23/00; G01L 23/02; G01L 23/06
   See application file for complete search history.

(56) References Cited

U.S. PATENT DOCUMENTS

| | | |
|---|---|---|
| 6,125,218 A | 9/2000 | Humphrey |
| 7,255,009 B1 | 8/2007 | Severson |

FOREIGN PATENT DOCUMENTS

| | | | | | |
|---|---|---|---|---|---|
| GB | 1501857 A | * | 2/1978 | ............. | G10L 19/12 |
| JP | 10300535 A | * | 11/1998 | ............. | G01L 11/00 |

\* cited by examiner

PRESSURE MEASURING DEVICE

CROSS-REFERENCE TO RELATED APPLICATIONS

This application is the national phase of International Application No. PCT/EP2016/073259, filed on Sep. 29, 2016, which claims priority to and the benefit of German Patent Application No. 202015105132.8, filed on Sep. 29, 2015, the disclosures of which are hereby incorporated by reference in their entireties.

The invention relates to a pressure-measuring device for converting a mechanical or hydraulic pressurization into a measurement signal and for forwarding the measurement signal to a remote evaluation unit.

In the control of machinery and pumps, such as piston pumps and diaphragm pumps, it is often necessary to determine the number of strokes of the machine or pump and the stroke frequency, i.e. the strokes per unit of time. If these measurements are to be carried out on machines or pumps located in a potentially explosive environment, special pressure gauges must be used which take this fact into account.

The invention has for its object to provide a simple and robust pressure measuring device that can be used in a hazardous environment without risk.

For this purpose, the pressure-measuring device according to the invention for converting a mechanical or hydraulic pressurization in a measurement signal and for forwarding the measurement signal to a remote evaluation unit is characterized by a transmitter head, which is arranged on a measuring device head of the pressure-measuring device and is to be connected by a first optical fiber with a light source, a receiver head, which is arranged on the measuring device head of the pressure-measuring device and which is arranged to receive the light emitted from the transmitter head via a light path in the measuring device head and is arranged for receiving the light output from the transmitter head via a light path in the measuring head and is to be connected via a second optical fiber to the evaluation unit, and a measuring member which upon a mechanical or hydraulic pressurization is mounted on the measuring device head slidably into the light path between the transmitter head and the receiver head, wherein the measurement signal is to be evaluated for counting the strokes of a machine or a pump and/or for determining the frequency of the pressurizations, i.e. the strokes per unit of time, of a machine or a pump. The pressure measuring device works without electricity and can therefore be used in potentially explosive environments. Furthermore, the pressure-measuring device according to the invention operates independently of position and is not impaired in their function by movement of the machine housing, for example on ships.

According to an advantageous embodiment, the pressure-measuring device according to the invention is characterized in that the measuring member comprises a plunger which is connected to a membrane which is exposed to the pressurization. By means of this relatively simple, mechanical design of the pressure-measuring device it is achieved in an advantageous manner that the pressure-measuring device according to the invention operates stably even under harsh environmental conditions. In addition, this pressure-measuring device can be set in an advantageous way to 0.5 to about 5 pulses per minute of the mechanical or hydraulic pulsations of the pressurization of the pressure-measuring device.

According to a further advantageous embodiment, the pressure-measuring device according to the invention is characterized in that the plunger is biased by a compression spring against the pressure on the membrane in a zero position. Since the compression spring determines the pressure value at which the membrane is effectively deflected, the value can easily be adjusted simply by selecting the spring constants at which the membrane is deflected.

According to a further advantageous embodiment, the pressure-measuring device according to the invention is characterized in that the penetration depth of the measuring member in the light path is adjustable, wherein the pressure-measuring device according to the invention can be set in an advantageous manner to individual devices.

According to a further advantageous embodiment, the pressure-measuring device according to the invention is characterized in that, for adjusting the penetration depth of the measuring member, the pressure-measuring device has a main body on which the measuring device head is mounted displaceably and lockably, whereby the adjustment of the pressure-measuring device according to the invention can be carried out in an advantageous manner.

According to a further advantageous embodiment, the pressure-measuring device according to the invention is characterized in that the fastening device comprises an adapter head connected to the main body, which has a connection nipple for attachment to the machine housing. As a result, it is advantageously achieved that only the adapter head needs to be replaced in order to adapt the inventive measuring device to a specific device.

According to a further advantageous embodiment, the pressure-measuring device according to the invention is characterized in that a threaded connection each is provided between the adapter head and the main body and between the adapter head and the machine housing, whereby a simple and secure connection between these parts of the pressure-measuring device according to the invention is achieved.

According to a further advantageous embodiment, the pressure-measuring device according to the invention is characterized in that the membrane is provided as a seal between the adapter head and the main body, whereby the membrane serves in an advantageous manner not only as part of the measuring system but also for sealing the pressure-measuring device according to the invention to the outside.

According to a further advantageous embodiment, the pressure-measuring device according to the invention is characterized in that as an additional seal between the adapter head and the main body, an O-ring is provided on the main body. The O-ring provides a simple and advantageous further sealing of the pressure-measuring device according to the invention to the outside.

Further advantages, features and possible applications of the present invention will become apparent from the following description in conjunction with the embodiments illustrated in the drawings.

BRIEF DESCRIPTION OF THE DRAWINGS

In the description, the claims and the drawing, the terms and associated reference numerals used in the list of reference numerals below are used. In the drawings:

DETAILED DESCRIPTION

Figure 1:
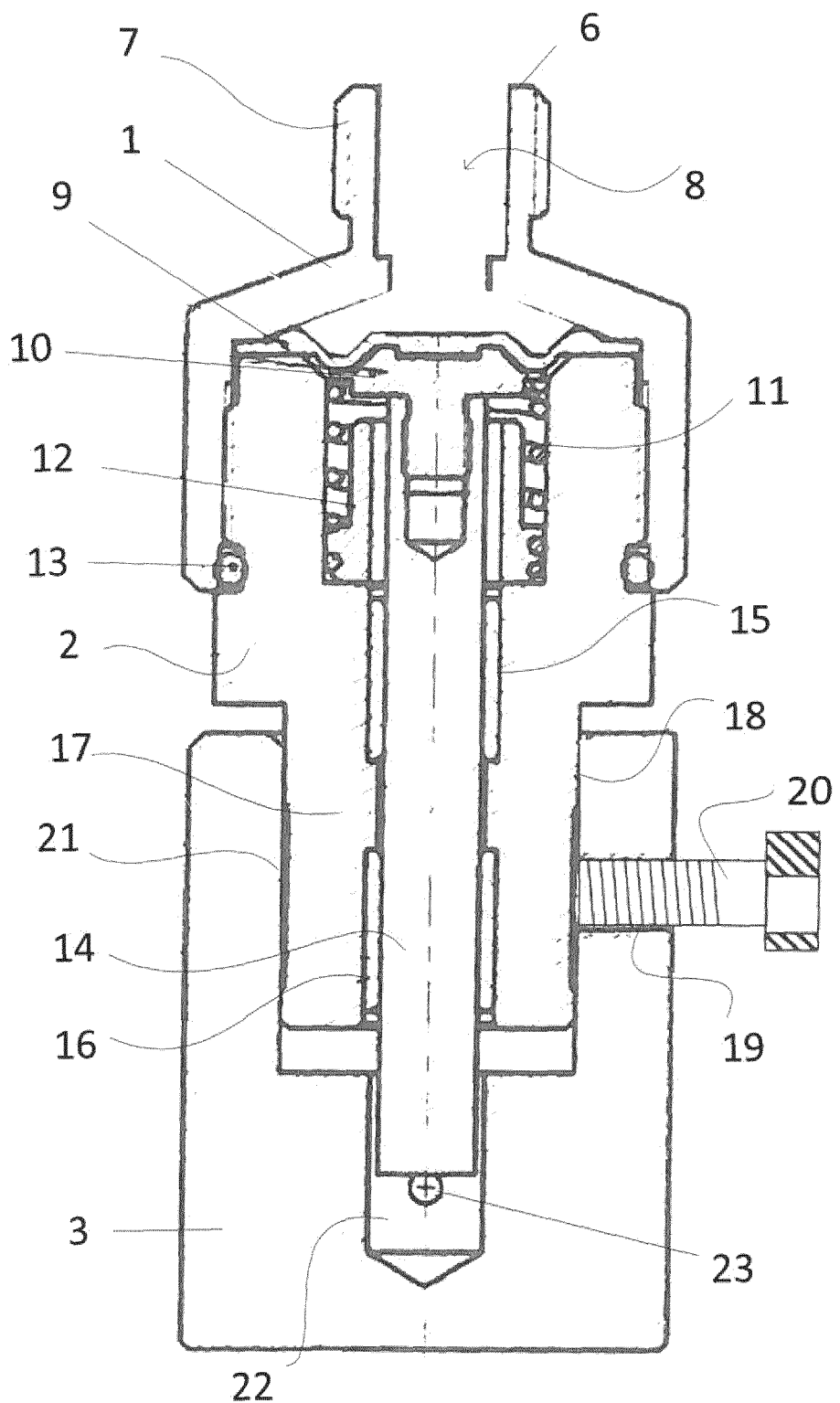
FIG. 1 shows a section through the pressure-measuring device according to the invention.
Figure 2:
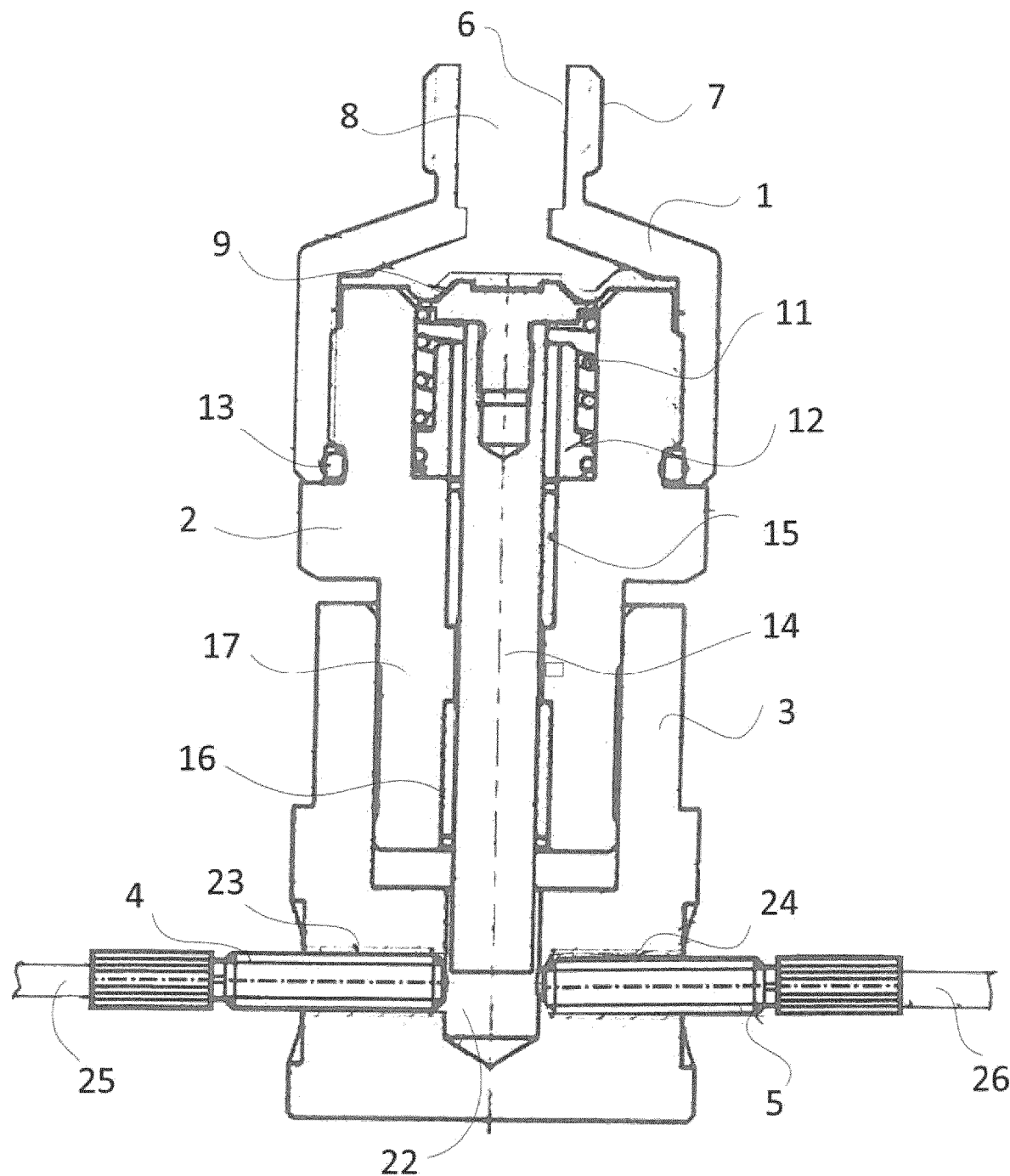
FIG. 2 shows a 90° offset section through the inventive pressure-measuring device according to FIG. 1.

The pressure-measuring device comprises an adapter head 1 for mounting the pressure-measuring device to a machine housing, a main body 2, to which the adapter head 1 is attached, and a sensor head 3, which is to be connected to the main body and to which a transmitter head 4 and a receiver head 5 is attached.

The adapter head 1 terminates on the one hand in a connection nipple 6 with an external thread 7 and on the other hand connected by an internal thread over an external thread of the main body 2. The connection nipple 6 is screwed with its external thread 7 into a screw opening of a machine housing, wherein a passage 8 of the connection nipple 6 is hydraulically connected to the interior of the machine housing.

On the main body 2, a membrane 9 is provided made of an elastomer, which is accessible from the passage 8 of the connecting nipple 6. The membrane 9 serves as a first seal between the adapter head 1 and the main body 2. The membrane 9 is held in position by the membrane plate 10.

Without external hydraulic or mechanical application, the diaphragm 9 is pressed by a compression spring 11 in the direction of the connection nipple 6. The compression spring 11 is held in position by a spring housing 12. This results in the zero position of the membrane 9. An O-ring 13 attached to the main body 2 serves as a second seal between the adapter head 1 and the main body 2, wherein the O-ring 13 is disposed between the adapter head 1 and the main body 2.

Mechanical or hydraulic pulsations by the plunger or pressure fluctuations from the interior of the machine housing are transmitted to the membrane 9 in this pressure measuring device.

The movement of the membrane plate 10 is transmitted to the sensor head 3 by a plunger 14 made of stainless steel and screwed into the membrane plate 10. So that the plunger 14 is mounted well slidable within the main body 2, it is guided by two bushes 15, 16.

The sensor head 3 is slidably mounted on the main body 2 thereby that an end extension 17 of the main body 2 is guided in a receiving bore 18 of the sensor head. The sensor head 3 can be locked on the main body 2 thereby that locking screw 20 which is screwed into a threaded bore 19 in the sensor head 3 cooperates with a recess in the form of a ratchet 21.

The sensor head 3 has a measuring bore 22 into which the plunger 14 protrudes. The length of the plunger 14 is dimensioned so that it does not obscure two diametrically opposed threaded bores 23, 24, which in the zero position extend radially to the sensor head 3. The transmitter head 4 and the receiver head 5 for the fiber optics are screwed into threaded bores 23, 24. The transmitter head 4 is connected to an optical fiber 25, which is arranged so that light is introduced into the measuring bore 22 of the sensor head 3. The precisely positioned optical fiber 25 introduces infrared light of an IR signal through the transmitter head 4 into the measuring bore 22. The receiver head 5 serves as a light receiver and transmits the infrared signal from the transmitter head 4 via an optical fiber 26 for measurement evaluation to a remote evaluation unit.

The optical fibers 25, 26 are thin cables of about 2.2 mm outer diameter and consist of a light-conducting inner core, for example, polymethacrylate with a black polyethylene sheath.

If, according to the invention, the device is fastened by means of the external thread 7 to a machine housing filled with hydraulic medium, hydraulic or mechanical plunger movements cause the diaphragm 9 and the plunger 14 to be deflected by 1 to 2 mm in the rhythm of these movements.

In preparation for the use of the device according to the invention, the sensor head 3 is displaced on the main body 2 with the locking screw 20 loosened until the plunger 14 interrupts the light path in the measuring bore 22 in the rhythm of the movements. Thereafter, the locking screw 20 is tightened, and thus the device according to the invention is ready for operation.

LIST OF REFERENCE NUMBERS

1 Adapter head
2 Main body
3 Sensor head
4 Transmitter head
5 Receiver head
6 Connection nipple
7 External thread
8 Passage
9 Diaphragm
10 Diaphragm plate
11 Pressure spring
12 Spring housing
13 O-ring
14 Plunger
15 Bushing
16 Bushing
17 End attachment
18 Mounting hole
19 Threaded hole
20 Locking screw
21 Locking
22 Measuring bore
23 Threaded hole
24 Threaded hole
25 Fiber
26 Fiber

The invention claimed is:

1. Pressure-measuring device for converting a mechanical or hydraulic pressurization in a measuring signal and for forwarding the measuring signal to a remote evaluation unit, characterized by
   a fastening device for fastening the pressure-measuring device to a machine housing of a motor or a pump,
   a transmitter head which is arranged on a measuring device head of the pressure measuring device and which is to be connected to a light source via a first optical fiber,
   a receiver head which is arranged on the measuring device head of the pressure measuring device and which is arranged to receive light emitted by the transmitter head via a light path in the measuring device head in relation to the transmitter head and to be connected to the evaluation unit via a second optical fiber,
   and a measuring element, which in case of a mechanical or hydraulic pressure is displaceable on the measuring device head into the light path between the transmitter head and the receiver head, and,
   wherein the measuring member comprises a plunger which is connected to a membrane which is exposed to the pressurization.

2. Pressure-measuring device according to claim 1, wherein the plunger is biased by a compression spring against the pressure on the membrane in a zero position.

3. Pressure-measuring device according to claim 1, wherein penetration depth of the plunger is adjustable in the light path.

4. Pressure measuring device according to claim 1, wherein for adjusting the penetration depth of the plunger, the pressure-measuring device comprises a main body on which the measuring device head is mounted displaceably and lockably.

5. Pressure measuring device according to claim 4, wherein the fastening device comprises an adapter head connected to the main body, which has a connection nipple for attachment to the machine housing.

6. Pressure-measuring device according to claim 5, wherein between the adapter head and the main body and between the adapter head and the machine housing a threaded connection each is provided.

7. Pressure-measuring device according to claim 5, wherein the membrane is provided as a seal between the adapter head and the main body.

8. Pressure-measuring device according to claim 5, wherein as an additional seal between the adapter head and the main body, an O-ring on the main body is provided.

9. Pressure measuring device for converting a mechanical or hydraulic pressurization in a measuring signal and for forwarding the measuring signal to a remote evaluation unit, comprising:

a fastening device for fastening the pressure-measuring device to a machine housing of a motor or a pump, a transmitter head which is arranged on a measuring device head of the pressure measuring device and which is to be connected to a light source via a first optical fiber, a receiver head which is arranged on the measuring device head of the pressure measuring device and which is arranged to receive light emitted by the transmitter head via a light path in the measuring device head in relation to the transmitter head and to be connected to the evaluation unit via a second optical fiber, and a measuring element, which in case of a mechanical or hydraulic pressure is displaceable on the measuring device head into the light path between the transmitter head and the receiver head, and, wherein the measuring signal is evaluated for counting strokes of a machine or a pump and/or for determining frequency of pressurizations, indicated as strokes per unit of time.

* * * * *